US006839809B1

(12) United States Patent
Forster et al.

(10) Patent No.: US 6,839,809 B1
(45) Date of Patent: Jan. 4, 2005

(54) METHODS AND APPARATUS FOR IMPROVING CONTENT QUALITY IN WEB CACHING SYSTEMS

(75) Inventors: Stewart Forster, Victoria (AU); Martin Kagan, Burlingame, CA (US); James A. Aviani, Jr., Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 609 days.

(21) Appl. No.: 09/583,588

(22) Filed: May 31, 2000

(51) Int. Cl.[7] .............................................. G06F 12/00
(52) U.S. Cl. ...................... 711/134; 711/120; 711/129; 709/215
(58) Field of Search .................. 711/118–120, 128–130, 711/132–134, 136, 159–160, 173; 709/203, 219, 213–215; 707/8

(56) References Cited

U.S. PATENT DOCUMENTS

| | | | |
|---|---|---|---|
| 4,827,411 A | | 5/1989 | Arrowood et al. .......... 707/206 |
| 4,965,772 A | | 10/1990 | Daniel et al. ............... 709/224 |
| 5,432,919 A | * | 7/1995 | Falcone et al. ............. 711/134 |
| 5,452,447 A | | 9/1995 | Nelson et al. .............. 707/205 |
| 5,511,208 A | | 4/1996 | Boyles et al. .............. 709/223 |
| 5,555,244 A | | 9/1996 | Gupta et al. ................ 370/397 |
| 5,604,894 A | * | 2/1997 | Pickens et al. ............... 703/15 |
| 5,611,049 A | | 3/1997 | Pitts ............................. 707/8 |
| 5,673,265 A | | 9/1997 | Gupta et al. ................ 370/432 |
| 5,751,971 A | | 5/1998 | Dobbins et al. ............ 709/238 |
| 5,774,660 A | | 6/1998 | Brendel et al. ............. 709/201 |
| 5,787,470 A | | 7/1998 | DeSimone et al. ......... 711/124 |
| 5,848,241 A | | 12/1998 | Misinai et al. .............. 709/213 |
| 5,852,717 A | | 12/1998 | Bhide et al. ................ 709/203 |
| 5,924,116 A | | 7/1999 | Aggarwal et al. .......... 711/122 |
| 5,935,207 A | | 8/1999 | Logue et al. ............... 709/219 |
| 5,940,594 A | | 8/1999 | Ali et al. .................... 709/203 |
| 5,987,233 A | | 11/1999 | Humphrey .................. 709/217 |
| 6,006,264 A | | 12/1999 | Colby et al. ................ 709/226 |
| 6,154,811 A | | 11/2000 | Srbljic et al. ............... 711/118 |
| 6,167,438 A | | 12/2000 | Yates et al. ................. 709/216 |
| 6,272,598 B1 | * | 8/2001 | Arlitt et al. ................. 711/133 |
| 6,327,644 B1 | * | 12/2001 | Beardsley et al. .......... 711/136 |

OTHER PUBLICATIONS

Valloppillil, Vinod, "Cache Array Routing Protocol v1.0", Oct. 20, 1997, Internet–Draft, http://dsl.internic/net/internet–drafts/draft–vinod–carp–v1–02.txt, pp. 1–6.

Cisco Technology, Inc., "Configuring IP Routing Protocols," Dec. 10, 1997, http://www.cisco.com/univercd/data/doc/software/11_2/cnp1/5ciprout.htm#REF40277, pp. 1–6 and 120–122.

Ousterhout, John K., et al., "A Trace–Driven Analysis of the UNIX 4.2 BSD File System," Jan. 2, 1993, *Computer Science Division, Electrical Engineering and Computer Science*, University of California, Berkeley, CA, pp. 1–12.

Ousterhout, John K., et al. "Beating the I/O Bottleneck: A Case for Log–Structured File Systems," Jan. 30, 1992, *Computer Science Division, Electrical Engineering and Computer Sciences*, University of California, Berkeley, CA, pp. 1–18.

Welch, Brent, "A Comparison of the Vnode and Sprite File System Architectures," *Proceedings of the USENIX File System Workshop*, May 1992, 18 pages.

Martin Arlitt, Ludmila Cherkasova, John Dilley, Rich Friedrich and Tai Jin, OF Hewlett–Packard Laboratories, "Evaluating Content Management Techniques for Web Proxy Caches", Apr. 30, 1999, 9 pages.

* cited by examiner

*Primary Examiner*—Nasser Moazzami
(74) *Attorney, Agent, or Firm*—Beyer Weaver & Thomas LLP

(57) ABSTRACT

Methods and apparatus are described for caching objects in a network cache. At least two memory queues are provided for storing the objects. Newly cached objects are stored in a first memory queue. Only selected objects are stored in a second memory queue, the selected objects having been accessed at least once while in the first memory queue.

14 Claims, 3 Drawing Sheets

METHODS AND APPARATUS FOR IMPROVING CONTENT QUALITY IN WEB CACHING SYSTEMS

BACKGROUND OF THE INVENTION

The present invention relates to transmission of data in a network environment. More specifically, the present invention relates to methods and apparatus for improving the efficiency with which data are transmitted over the Internet. Still more specifically, the present invention provides techniques by which the efficiency of an Internet cache may be improved.

Generally speaking, when a client platform communicates with some remote server, whether via the Internet or an intranet, it crafts a data packet which defines a TCP connection between the two hosts, i.e., the client platform and the destination server. More specifically, the data packet has headers which include the destination IP address, the destination port, the source IP address, the source port, and the protocol type. The destination IP address might be the address of a well known World Wide Web (WWW) search engine such as, for example, Yahoo, in which case, the protocol would be TCP and the destination port would be port 80, a well known port for http and the WWW. The source IP address would, of course, be the IP address for the client platform and the source port would be one of the TCP ports selected by the client. These five pieces of information define the TCP connection.

Given the increase of traffic on the World Wide Web and the growing bandwidth demands of ever more sophisticated multimedia content, there has been constant pressure to find more efficient ways to service data requests than opening direct TCP connections between a requesting client and the primary repository for the desired data. Interestingly, one technique for increasing the efficiency with which data requests are serviced came about as the result of the development of network firewalls in response to security concerns. In the early development of such security measures, proxy servers were employed as firewalls to protect networks and their client machines from corruption by undesirable content and unauthorized access from the outside world. Proxy servers were originally based on Unix machines because that was the prevalent technology at the time. This model was generalized with the advent of SOCKS which was essentially a daemon on a Unix machine. Software on a client platform on the network protected by the firewall was specially configured to communicate with the resident demon which then made the connection to a destination platform at the client's request. The demon then passed information back and forth between the client and destination platforms acting as an intermediary or "proxy."

Not only did this model provide the desired protection for the client's network, it gave the entire network the IP address of the proxy server, therefore simplifying the problem of addressing of data packets to an increasing number of users. Moreover, because of the storage capability of the proxy server, information retrieved from remote servers could be stored rather than simply passed through to the requesting platform. This storage capability was quickly recognized as a means by which access to the World Wide Web could be accelerated. That is, by storing frequently requested data, subsequent requests for the same data could be serviced without having to retrieve the requested data from its original remote source. Currently, most Internet service providers (ISPs) accelerate access to their web sites using proxy servers.

Unfortunately, interaction with such proxy servers is not transparent, requiring each end user to select the appropriate proxy configuration in his or her browser to allow the browser to communicate with the proxy server. For the large ISPs with millions of customers there is significant overhead associated with handling tech support calls from customers who have no idea what a proxy configuration is. Additional overhead is associated with the fact that different proxy configurations must be provided for different customer operating systems. The considerable economic expense represented by this overhead offsets the benefits derived from providing accelerated access to the World Wide Web. Another problem arises as the number of WWW users increases. That is, as the number of customers for each ISP increases, the number of proxy servers required to service the growing customer base also increases. This, in turn, presents the problem of allocating packet traffic among multiple proxy servers.

Another technique for increasing the efficiency with which data requests are serviced is described in commonly assigned, copending U.S. patent application Ser. No. 08/946, 867 for METHOD AND APPARATUS FOR FACILITATING NETWORK DATA TRANSMISSIONS filed Oct. 8, 1997, the entirety of which is incorporated herein by reference for all purposes. The invention described in that copending application represents an improvement over the proxy server model which is transparent to end users, high performance, and fault tolerant. By altering the operating system code of an existing router, the router is enabled to redirect data traffic of a particular protocol intended for a specified port, e.g., TCP with port 80, to one or more caching engines connected to the router via an interface having sufficient bandwidth such as, for example, a 100baseT interface. If there are multiple caching engines connected to the cache-enabled router, the router selects from among the available caching engines for a particular request based on a simple algorithm according to which a particular group of addresses is associated with each caching engine.

The caching engine to which the request is re-routed "spoofs" the requested destination platform and accepts the request on its behalf via a standard TCP connection established by the cache-enable router. If the requested information is already stored in the caching engine, i.e., a cache "hit" occurs, it is transmitted to the requesting platform with a header indicating its source as the destination platform. If the requested information is not in the caching engine, i.e., a cache "miss" occurs, the caching engine opens a direct TCP connection with the destination platform, downloads the information, stores it for future use, and transmits it to the requesting platform. All of this is transparent to the user at the requesting platform which operates exactly as if it were communicating with the destination platform. Thus, the need for configuring the requesting platform to suit a particular proxy configuration is eliminated along with the associated overhead. Moreover, traffic may be easily allocated among as many caching engines as become necessary. Thus, content caching provides a way to compensate for the bandwidth limitations discussed above.

The success of content caching in compensating for bandwidth limitations corresponds directly to the efficiency with which the caching engines operate. The higher the cache hit rate, i.e., cache hits as a percentage of the total number of requests, the greater the bandwidth savings. For a typical caching engine, the cache hit rate is approximately 30 to 40%. This percentage includes cache misses for non-cacheable objects. This means that 60 to 70% of objects stored in caching engines are never used again. That is, 60 to 70% of the caching engine's storage is used to store objects which will never be requested again. In addition, because new objects are constantly replacing old objects, it is likely that some of the 30 to 40% of objects which are likely to be requested more than once are being overwritten by the objects which will never be requested again. It is therefore clear that the typical caching engine is working nowhere near the level of efficiency which is at least theoretically possible.

Techniques for improving caching efficiency are described in commonly assigned copending U.S. patent application Ser. No. 09/259,149 for METHODS AND APPARATUS FOR CACHING NETWORK TRAFFIC filed on Feb. 26, 1999, the entirety of which is incorporated herein by reference for all purposes. The invention described therein achieves improvements in caching efficiency by favoring the caching of objects which are statistically likely to be requested again. According to a one embodiment, when a caching engine experiences an initial cache miss for a requested object, the object is retrieved and sent to the requesting host but the object is not cached. Instead, the caching engine makes an entry corresponding to the requested object in a table in which it tracks objects for which at least one cache miss has occurred. If another request for the object is received, the object is retrieved, sent to the requesting host, and, because an entry corresponding to the requested object exists in the table, the object is cached. In other words, an object is only cached if it has been requested at least twice. The idea is that if an object has been requested two or more times it is statistically more likely to be requested again than an object for which only one request has been received. It follows then that, because the cache is populated only by objects which are likely to be requested, cache efficiency is correspondingly improved.

As it turns out, the frequency with which objects are requested on the web over a given relatively short period of time, e.g., two weeks, follows a distribution much like the well known Zipf distribution which represents the frequency of word usage in language. In such a distribution, a very small number of words (or objects in the network context) are used (or requested) at a frequency much greater than the majority of words (or objects). Therefore, it is desirable that caching systems take advantage of this relationship. That is, it would be advantageous to provide a caching system in which more frequently requested objects remain in the cache longer than less frequently requested objects.

Such a cache system should attempt to make the best use of its storage space to maximize the number of accesses to currently cached objects. One approach to this problem is represented by a least-recently-used LRU memory. A standard LRU queue operates according to a least recently used algorithm in which each time an object in the queue is accessed, it is moved to the head of the queue. When a new object is cached it is placed at the head of the queue and the item(s) at the end of the queue, i.e., the least recently used object(s), is (are) bumped from the queue.

Another approach is the use of a least-frequently-used (LFU) memory. This approach keeps track of the number of accesses for each object currently in the queue. The least frequently used object(s) in the queue is (are) bumped from the queue for the caching of a new object.

However, neither of these techniques takes advantage of the Zipf-like distribution followed by object requests in that any newly requested cacheable object is, at least initially, given the same status as any of the other objects in the queue. In addition, standard LRU memories have been shown to be effective only where the size of the cache is extremely large, quickly losing their abilities to hold valuable objects as the size of the content store is reduced. And LFU memories, while better than LRU memories for small to medium content stores, are computationally expensive.

Therefore, despite the improvements represented by all of the techniques described above, and given the value of any improvement in the usage of network transmission resources, it is desirable to improve the efficiency with which network caching systems cache data objects.

SUMMARY OF THE INVENTION

According to the present invention, a "quality" cache system is provided which employs a multi-tiered object content system. According to a specific embodiment, the cache system of the present invention is implemented with a plurality of memory queues, each of which operates as least-recently-used (LRU) queue. The total storage space in the cache is divided among the plurality of LRU queues to take advantage of the Zipf-like distribution of requested objects.

In a more specific embodiment, the cache system employs two LRU queues. When a first requested object is determined to be cacheable it is retrieved and inserted at the head of the first LRU queue and the time of access is recorded. Each time an object is accessed, the time of the access is recorded. If the first object is not accessed again before it reaches the end of the first LRU queue, it is deleted.

If, on the other hand, the first object is accessed while present in the first LRU queue, the last time of access for the first object is compared to the last time of access of the object at the tail end of the second LRU queue. If the last time of access of the first object is more recent than the last time of access of the tail end object of the second LRU queue, the first object is moved to the head of the second LRU queue and the access time is recorded. If the second LRU queue is full, enough objects from the tail end of the queue are moved to the head of the first LRU queue to accommodate the first object. If the last time of access of the first object is not more recent than the last time of access of the tail end object of the second LRU queue, the first object is moved to the head of the first LRU queue and the access time is recorded.

According to the Zipf-like distribution of object requests, many fewer objects are requested multiple times. As a result, the second queue decays more slowly than the first. Effectively, the top of the Zipf distribution is moved into the second queue. Moreover, the least-recently-used nature of the queues ensures that the objects stored in the two queues reflect current conditions as the distribution of object requests migrates over time.

Thus, the present invention provides methods and apparatus for caching objects in a network cache. At least two memory queues are provided for storing the objects. Newly cached objects are stored in a first memory queue. Only selected objects are stored in a second memory queue, the selected objects having been accessed at least once while in the first memory queue.

According to a more specific embodiment, further methods and apparatus are provided for caching objects in a network cache.

According to a still more specific embodiment, still further methods and apparatus are provided for caching objects in a network cache.

A further understanding of the nature and advantages of the present invention may be realized by reference to the remaining portions of the specification and the drawings.

DETAILED DESCRIPTION OF SPECIFIC EMBODIMENTS

Figure 1:
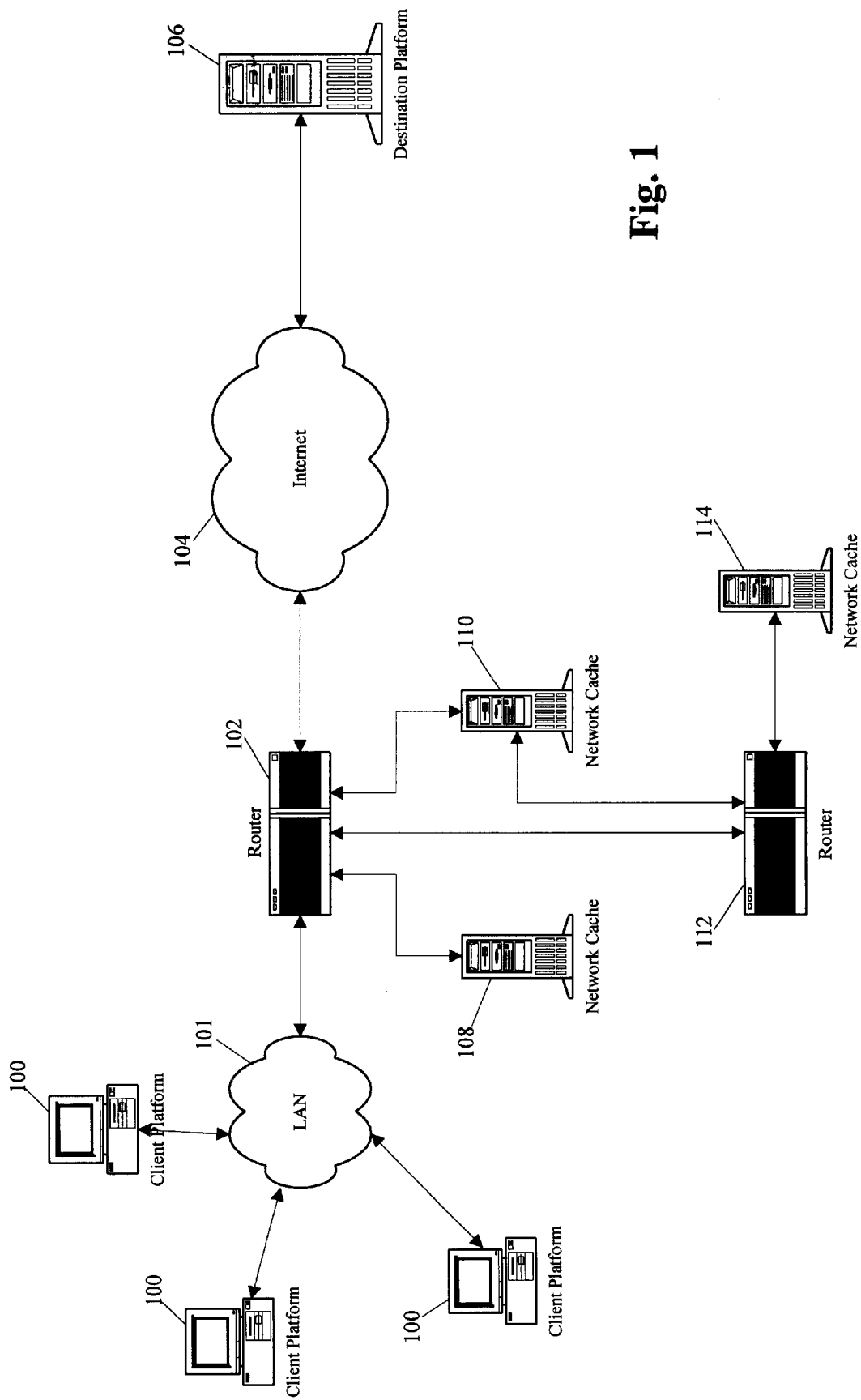
FIG. 1 is a block diagram of a network environment in which specific embodiments of the present invention may be implemented.

FIG. 1 shows a hardware environment in which the present invention may be implemented. A plurality of client platforms 100 are interconnected via LAN 101. LAN 101 is connected to router 102 which is connected via network 104 to destination platform 106. It will be assumed for the purposes of this discussion that client platforms 100 are single personal computers or work stations, that router 102 connects platform 100 to the Internet, i.e., network 104, and that destination platform 106 is a server on the World Wide Web. It should be noted, however, that a variety of configurations similar to this simple model may be employed without departing from the scope of the invention. For example, client platforms 100 could be connected via a wide area network. Router 102 could be an internal router in a LAN or a WAN (e.g., an intranet connection to an internal web page), the network's general gateway to the Internet, a direct connection to destination platform 106, or some intermediate platform between the network and destination platform 106. The connection between router 102 and client platforms 100 could include several intervening routers. Network 104 could represent a local or wide area network which includes client platforms 100 and router 102, or the Internet. Destination platform 106 could be part of the local or wide area network, or a remote server on the Internet. Referring back to FIG. 1, network caches 108 and 110 are connected to router 102. Additional router 112 is connected to router 102 and has an additional network cache 114 connected thereto.

It will be understood that the network caches described herein may employ any of a variety of existing file systems and remain within the scope of the invention. For example, the invention may be implemented using a Unix general purpose file system or the equivalent. A particular embodiment of the invention employs the file system described in commonly assigned, U.S. Pat. No. 5,950,205 for DATA TRANSMISSION OVER THE INTERNET USING A CACHE MEMORY FILE SYSTEM issued on Sep. 7, 1999, the entire specification of which is incorporated herein by reference for all purposes.

During normal operation, a client platform 100 transmits a request to retrieve data such as, for example, a multimedia object from destination platform 106. Cache-enabled router 102 receives the request in the form of at least one data packet. Router 102 reads the packet header to determine whether, for example, it is a TCP packet and indicates port 80 as its destination port. If the packet is of a different protocol or is not destined for the World Wide Web, the packet is simply passed through the router and routed according to standard Internet protocols.

If, on the other hand, the packet is TCP and port 80 is specified, router 102 determines to which of its associated network caches (108 and 110) it will redirect the packet based on the destination IP address specified in the packet. Before sending the packet to one of its associated network caches, router 102 encapsulates the packet for transmission to the selected network cache by adding another TCP/IP header which designates the router as the source of the packet and the network cache as the destination. That is, the router encapsulates the packet for transmission to a network cache which might be several "hops" away. So, for example, router 102 might encapsulate the packet for transmission to network cache 114 which is connected to router 102 via router 112. Thus, not only may multiple network caches be associated with a particular router, but multiple routers may be supported by an individual network cache or a group of network caches. This allows a tremendous amount of flexibility in where the network cache and router need to be in relation to each other.

A TCP connection is established between the client and the selected network cache and router 102 transmits the encapsulated packet to the network cache. The network cache determines if it has the requested object stored locally by comparing the destination URL to its directory. If the object is determined to be locally stored in the network cache, it is transmitted to client platform 100. If, on the other hand the object is not in the cache, the network cache makes its own request for the object (using its own address as the source IP address) to destination platform 106 via router 102. That is, router 102 establishes a TCP connection between the network cache and destination platform 106. The router sees that the new request is from the network cache (by looking at the source address) and thereby knows not to redirect the packet to the network cache. This request and the subsequent retrieval of the object from destination platform 106 is done according to standard TCP/IP protocols. The retrieved object is then transmitted to client platform 100.

Figure 2:
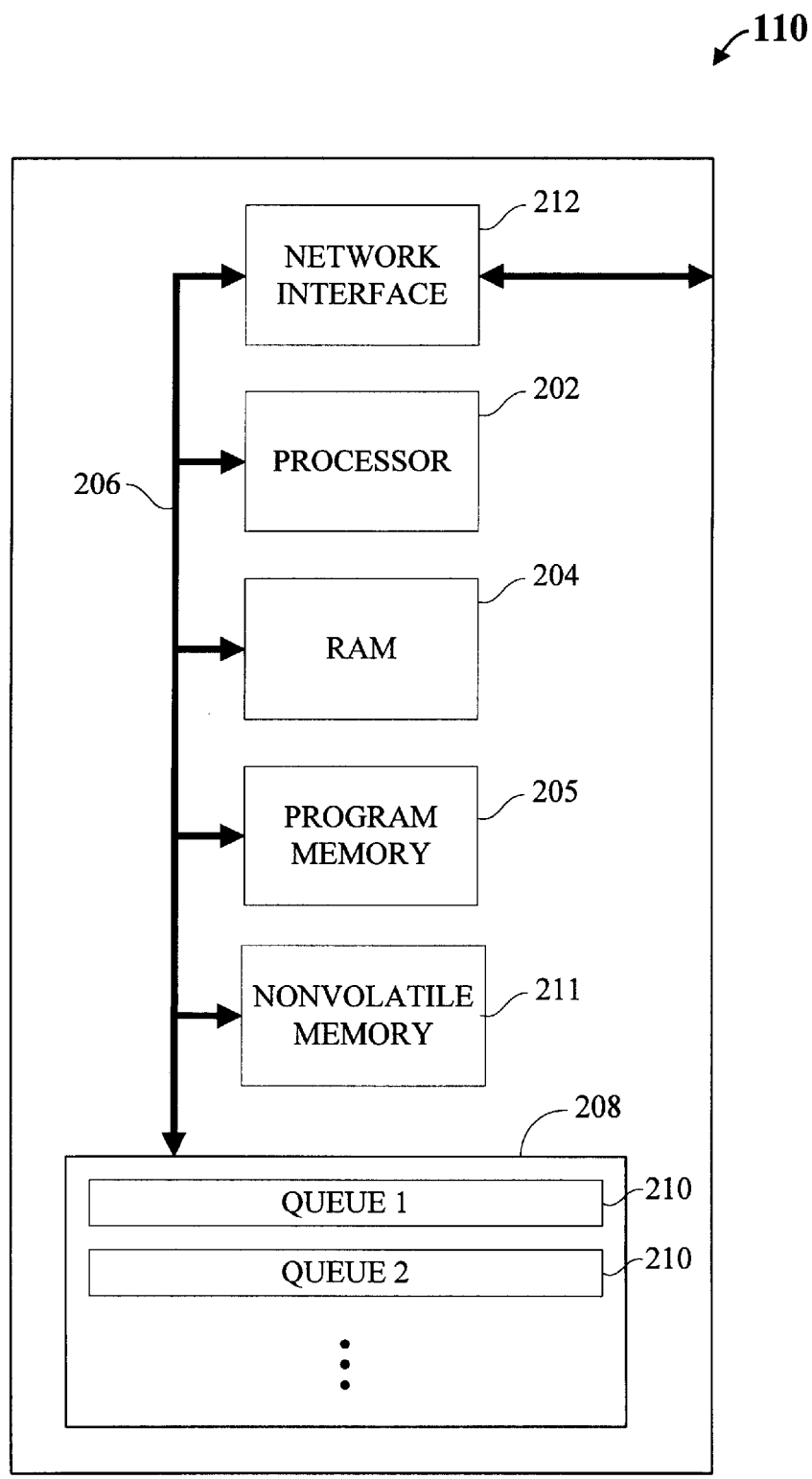
FIG. 2 is a block diagram of a network cache for use with specific embodiments of the present invention.

FIG. 2 is a block diagram of a network cache such as, for example, cache 110 of FIG. 1. A central processor 202 controls operation of cache 110 and its various subsystems using system memory 204 and bus 206. Data objects are stored in cache memory 208 which, in a specific embodiment, comprises multiple queues of volatile RAM 210. According to various embodiments, memory 208 may comprise one or more nonvolatile disk drives. According to yet other embodiments, memory 208 may comprise any combination of volatile and nonvolatile memory.

According to a specific embodiment, a nonvolatile disk drive 211 is provided as additional storage for cached objects. According to a more specific embodiment, cache objects below a certain size, e.g., html objects, are stored in RAM queues 210 and those above a certain size, e.g., graphic objects, are stored in nonvolatile memory 211. In one such embodiment, the size threshold for determining in which memory to cache an object is 16K. That is, objects which are 16 kilobytes or smaller would be stored in RAM queues 210, while object larger than 16 kilobytes would be stored in memory 211. In another such embodiment, the size threshold is 32K. This segregation of objects by size allows extremely fast access to most cache objects via the RAM without the potential for very large objects to completely swamp a particular RAM queue and undermine the efficiency of cache operation.

A network interface 212 enables communication with external devices. Portions of memory 210 may also be employed for other purposes such as, for example, storing software code for directing the operation of various functionalities of cache 110. Alternatively, program instructions for execution by processor 202 directing operation of the functionalities of cache 110 may be stored in a separate program memory 205. It will be understood that the cache architecture shown in FIG. 2 is merely illustrative and should not be construed to limit the scope of the present invention. That is, any of a wide variety of cache architectures may be employed to implement the present invention.

Figure 3:
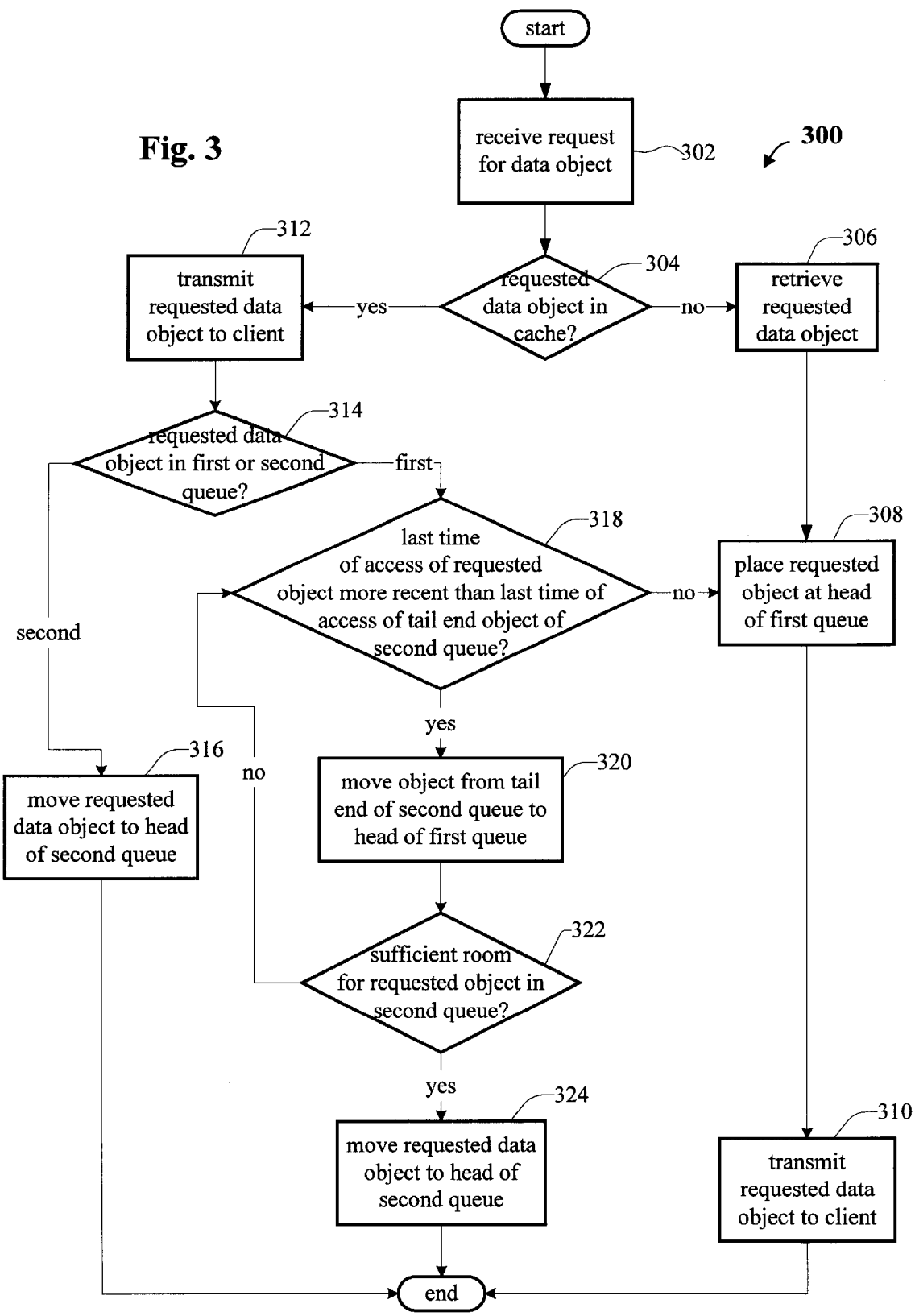
FIG. 3 is a flowchart illustrating the caching of objects according to a specific embodiment of the present invention.

The way in which objects are cached in network cache 110 of FIG. 2 will now be described with reference to flowchart 300 of FIG. 3. The embodiment of FIG. 3 is described with reference to a network cache 210 in which memory 208 comprises two least-recently-used (LRU) queues 210. It will be understood, however, that embodiments with more than two such queues are within the scope of the present invention. It will also be understood that the invention includes embodiments in which queues 210 are implemented according to other schemes, e.g., a least-frequently-used (LFU) scheme, a weighted LFU, a FIFO, or the file system described in the above-referenced patent.

Referring now to FIG. 3, when the network cache of the present invention receives a request for a data object and determines that the object is cacheable (302), it is then determined whether the object currently resides in the cache (304). If the object does not currently reside in the cache, it is retrieved from the destination platform of the original request (or an intervening cache platform) (306) in the manner described above with reference to FIG. 1. The retrieved object is then placed at the head of the first LRU queue (308) and transmitted to the requesting client (310).

If the object currently resides in the cache (304), it is transmitted to the requesting client (312) in response to the request as described above with reference to FIG. 1. If the requested object is in the second LRU queue (314), it is moved to the head of the second LRU queue (316) and the time of access is recorded. The most recent access time of each object in the cache is stored for reasons which will become clear.

If the requested object is in the first LRU queue (314), it is determined whether the last, i.e., the previous, time of access of the requested object is earlier than the last time of access of the object at the tail end of the second LRU queue (318). If not, The requested object is placed at the head of the first LRU queue (308) and transmitted to the requesting client (310). If so, the object at the tail end of the second queue is moved to the head of the first queue (320). If this frees up sufficient room in the second queue for the requested object (322), the requested object is moved to the head of the second queue (324). If there is not enough room in the second queue to accommodate the requested object (322), a sufficient number of objects are moved from the tail end of the second queue to the head of the first queue (318–324) to make room for the requested object at the head of the second queue. That is, the previous access time of the requested object is compared with the last access time of each of the tail end objects of the second queue (318) until enough have been moved (320) to accommodate the requested object in the second queue (322). If, however, a tail end object in the second queue is encountered which was accessed more recently than the previous access time of the requested object (318), the requested object is placed at the head of the first queue (308).

One of the advantages of the present invention is that it makes feasible the use of high speed RAM for caching content in web caching applications. This, in turn makes it possible to provide extremely high speed web content caches which are capable of running effectively at major network junctions and thereby improving quality of service to network users. Other advantages include the fact that the present invention represents a relatively small CPU overhead and is relatively simple to implement. In additions, modifications to router operating systems are not necessary for implementation of the invention.

While the invention has been particularly shown and described with reference to specific embodiments thereof, it will be understood by those skilled in the art that changes in the form and details of the disclosed embodiments may be made without departing from the spirit or scope of the invention. For example, specific embodiments described herein refer to comparisons between the tail end objects in respective queues. However, it is envisioned that other objects in the respective queues could be compared for similar purposes. For example, other criteria such as the frequency of access or the size of the object could be used when determining whether an object in one queue should be placed in another.

In addition, while a specific embodiment has been described with two memory queues, further embodiments are contemplated having more than two such queues with objects migrating toward the higher queues in a similar manner to the migration from the first to the second queue discussed above with reference to FIG. 3. Therefore, the scope of the invention should be determined with reference to the appended claims.

What is claimed is:

1. A method for caching objects in a network cache comprising:

receiving a request for a first object from a remote client;

where the first object is not currently in the network cache:

retrieving the first object from a remote platform;

placing the first object in a first memory queue in the network cache; and transmitting the first object to the remote client; and where the first object is currently in the network cache:

transmitting the first object to the remote client;

comparing the first object with a second object in a second memory queue in which only selected ones of the objects are stored, the selected ones of the objects having been accessed at least once while in the first memory queue;

where the first object has been accessed more recently than the second object, placing the first object in the second memory queue; and where the second object has been accessed more recently than the first object, retaining the first object in the first memory queue.

2. The method of claim 1 wherein the first and second memory queues comprise least-recently-used (LRU) queues.

3. The method of claim 1 wherein the first and second memory queues comprise random access memory (RAM).

4. The method of claim 1 wherein the first and second memory queues comprise least-frequently-used (LFU) queues.

5. The method of claim 4 wherein the LFU queues comprise weighted LFU queues.

6. The method of claim 1 wherein the first and second memory queues comprise FIFO queues.

7. The method of claim 1 further comprising removing the first object from the first memory queue where the first object is not accessed at least once while in the first memory queue.

8. The method of claim 1 further comprising making room in the second memory queue for storage of the first object by removing at least one of the selected objects from the second memory queue and placing the at least one of the selected objects in the first memory queue.

9. The method of claim 8 wherein the at least one of the selected objects comprises the second object.

10. The method of claim 1 further comprising providing at least one further memory queue beyond the second memory queue, each successive memory queue being for storing a subset of the selected objects which have been accessed at least once while in an immediately previous one of the memory queues.

11. A network cache, comprising:

cache memory comprising at least a first and second memory queues for storing a plurality of objects; and an operating system which is operable to:
  receive a request for a first object from a remote client;
  where the first object is not currently in the network cache:
    retrieve the first object from a remote platform;
    place the first object in a first memory queue in the network cache; and
    transmit the first object to the remote client; and
  where the first object is currently in the network cache:
    transmit the first object to the remote client;
    compare the first object with a second object in a second memory queue in which only selected ones of the objects are stored, the selected ones of the objects having been accessed at least once while in the first memory queue;
    where the first object has been accessed more recently than the second object, place the first object in the second memory queue; and
    where the second object has been accessed more recently than the first object, retain the first object in the first memory queue.

12. The network cache of claim 11 wherein the at least first and second memory queues comprise more than two memory queues, each successive memory queue for storing further selected ones of the plurality of objects which have been accessed at least once while in an immediately previous one of the more than two memory queues.

13. A computer program product for caching objects in a network cache comprising:

at least one computer readable medium; and program instructions stored in the at least one computer readable medium for causing at least one computer to:
  receive a request for a first object from a remote client;
  where the first object is not currently in the network cache:
    retrieve the first object from a remote platform;
    place the first object in a first memory queue in the network cache; and
    transmit the first object to the remote client; and
  where the first object is currently in the network cache:
    transmit the first object to the remote client;
    compare the first object with a second object in a second memory queue in which only selected ones of the objects are stored, the selected ones of the objects having been accessed at least once while in the first memory queue;
    where the first object has been accessed more recently than the second object, place the first object in the second memory queue; and
    where the second object has been accessed more recently than the first object, retain the first object in the first memory queue.

14. A network cache for caching objects, comprising:

means for receiving a request for a first object from a remote client;

means for retrieving the first object from a remote platform and placing the first object in a first memory queue in the network cache where the first object is not currently in the network cache;

means for comparing the first object with a second object in a second memory queue where the first object is currently in the network cache, the second memory queue storing only selected ones of the objects which been accessed at least once while in the first memory queue;

means for placing the first object in the second memory queue where the first object has been accessed more recently than the second object;

means for retaining the first object in the first memory queue where the second object has been accessed more recently than the first object; and means transmitting the first object to the remote client.

* * * * *